(12) United States Patent
Blum

(10) Patent No.: US 6,727,619 B1
(45) Date of Patent: Apr. 27, 2004

(54) ROTARY LOCKING MOTOR RETAINER IN A TRANSMISSION HOUSING

(75) Inventor: David E. Blum, Bergen, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/280,425

(22) Filed: Oct. 25, 2002

(51) Int. Cl.[7] .................................................. H02K 5/00
(52) U.S. Cl. ......................... 310/91; 248/613; 248/638
(58) Field of Search .............................. 310/91, 51, 89; 248/640, 647, 674, 676, 678, 612, 613; 74/606 R; 29/596; 476/4, 11

(56) References Cited

U.S. PATENT DOCUMENTS

| | | | | |
|---|---|---|---|---|
| 5,126,607 A | * | 6/1992 | Merriman, Jr. | 310/51 |
| 6,040,649 A | * | 3/2000 | Horng | 310/91 |
| 6,045,112 A | * | 4/2000 | Kirkwood | 248/634 |
| 6,247,223 B1 | * | 6/2001 | Keck | 29/596 |

* cited by examiner

Primary Examiner—Burton S. Mullins
Assistant Examiner—Leda Pham
(74) Attorney, Agent, or Firm—Patrick M. Griffin

(57) ABSTRACT

A transmission housing includes a well, for receiving an electric drive motor, and a shaft hole, for receiving an idler gear shaft. The motor well is surrounded at its open end by a plurality of lugs formed in the housing and having inwardly-facing slots for receiving a motor retainer plate. The plate has a central opening for receiving and accurately positioning the motor. The retainer plate has a pattern of edge notches identical to the arrangement of the lugs but rotationally offset by an appropriate central angle. The plate is inserted axially past the lugs via the notches and then rotated through the central angle to engage the non-notched edge of the plate in the slots, thereby securing and positioning the motor in the well. A flange extending from the plate has a second hole precisely located at a distance from the plate center hole. With the plate rotated into motor-retaining position, the second hole is coaxial with the idler shaft hole. An idler shaft pressed into the second plate hole and the shaft hole in the housing is properly positioned with respect to the motor drive shaft and locks the retaining plate against rotating backwards from engagement with the lugs.

10 Claims, 3 Drawing Sheets

ROTARY LOCKING MOTOR RETAINER IN A TRANSMISSION HOUSING

TECHNICAL FIELD

The present invention relates to geared transmissions; more particularly, to such a transmission powered by an integral electric motor; and most particularly, to an electrically powered transmission wherein a rotary locking motor mount accurately positions and retains a motor within the transmission case without resort to any separate fasteners and also positions an idler gear shaft accurately with respect to the motor shaft.

BACKGROUND OF THE INVENTION

Geared transmissions employing an electric drive motor are well known. Such transmissions are commonly used in small appliances, such as washing machines, and also, for example, in various automotive applications. These transmissions may or may not have capability for changing gear ratios (shifting) or reversing direction of rotation. Typically, a gear case is specially formed as by casting from metal or polymer for receiving a motor subassembly having a drive shaft supporting a drive gear, and an idler shaft supporting a driven gear that meshes with the drive gear to define a gear train. In some configurations, additional shafts and gears are present in the gear train to achieve specific rotary actuation purposes.

Prior art transmissions are known to be difficult and time-consuming to assemble. The drive motor must be accurately located, both axially and radially, with respect to the housing, and typically is secured to the housing via a plurality of screws or bolts. The idler shaft also must be accurately located in the housing In order to be positioned correctly with respect to the motor shaft. Normal manufacturing variation in dimensions of the housing and the motor-mounting hardware and the idler shaft-mounting hardware, as well as operator variation in placement of the motor subassembly, can result in an undesirably large variation in the distance between the motor drive axis and the idler shaft axis. Preferably, such variation is minimal so that the drive gear and driven gear have a predetermined and predictable amount of lash therebetween.

What is needed is a simple means for reliably and accurately positioning and retaining a motor subassembly and an idler shaft in a geared transmission housing without resort to threaded fasteners, gauges, or specialized assembly tools.

It is a principal object of the present invention to reduce the cost and complexity of manufacturing an electrically-powered transmission.

It is a further object of the invention to reduce the variability of interaxial spacing in such a transmission.

SUMMARY OF THE INVENTION

Briefly described, a transmission housing is formed having a well for an electric motor and a spaced-apart shaft hole for receiving an idler gear shaft. A motor is disposed in the well on spring means. The motor well is surrounded at its open end by a plurality of lugs formed in the housing and having inwardly-facing slots for receiving a motor retainer plate. The plate has a central opening for receiving and accurately positioning a shaft journal or frame extension of the motor. The retainer plate has a pattern of edge notches identical to the arrangement of the lugs but rotationally offset therefrom by an appropriate central angle. With the motor (preferably minus the drive gear) approximately centered in the well and resting on the spring means, the plate is inserted axially past the lugs via the notches, compressing the spring means, and then rotated through the central angle to engage the non-notched edge of the plate in the slots, thereby securing and positioning the motor in the well. A flange extending radially from the motor retainer plate has a second hole precisely located at a predetermined interaxial distance from the plate center hole. With the plate rotated into motor-retaining position, the second hole is coaxial with the shaft hole in the housing. An idler shaft pressed into the second plate hole and the shaft hole in the housing is thus properly positioned with respect to the motor drive shaft and further locks the retaining plate against rotating backwards from engagement with the lugs.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
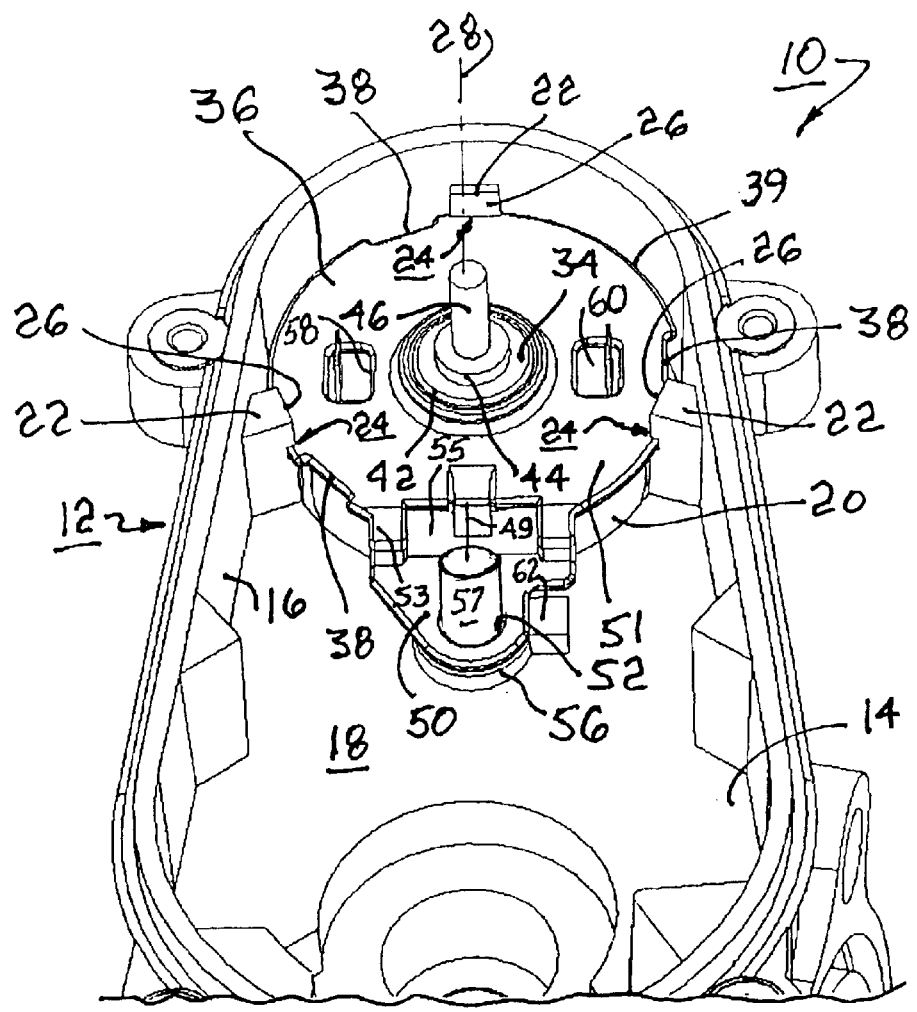
FIG. 1 is an isometric view of a partially-assembled transmission in accordance with the invention, showing a retainer plate retaining a drive motor and in position for subsequently receiving an idler shaft.
Figure 2:
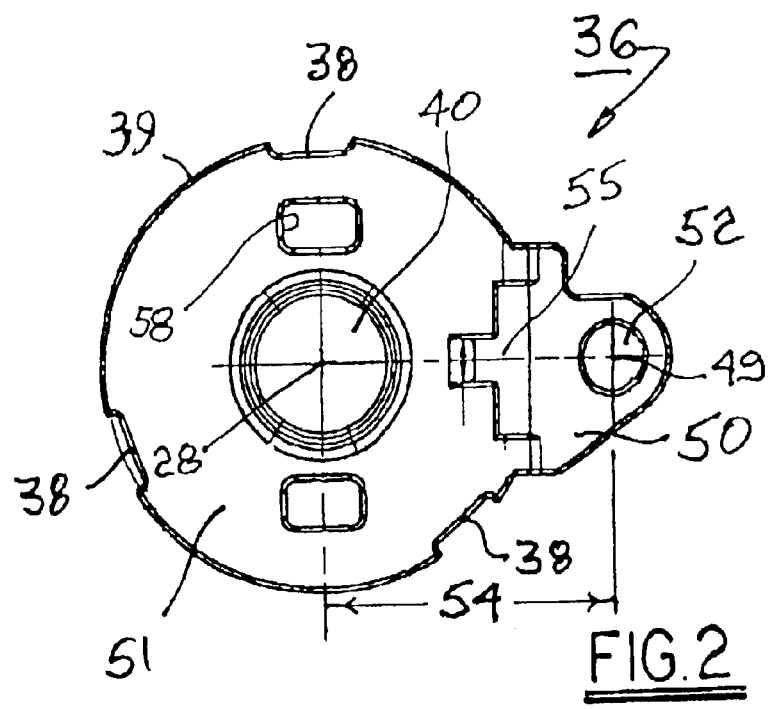
FIG.2 is a plan view of the retainer plate shown in FIG. 1.
Figure 3:
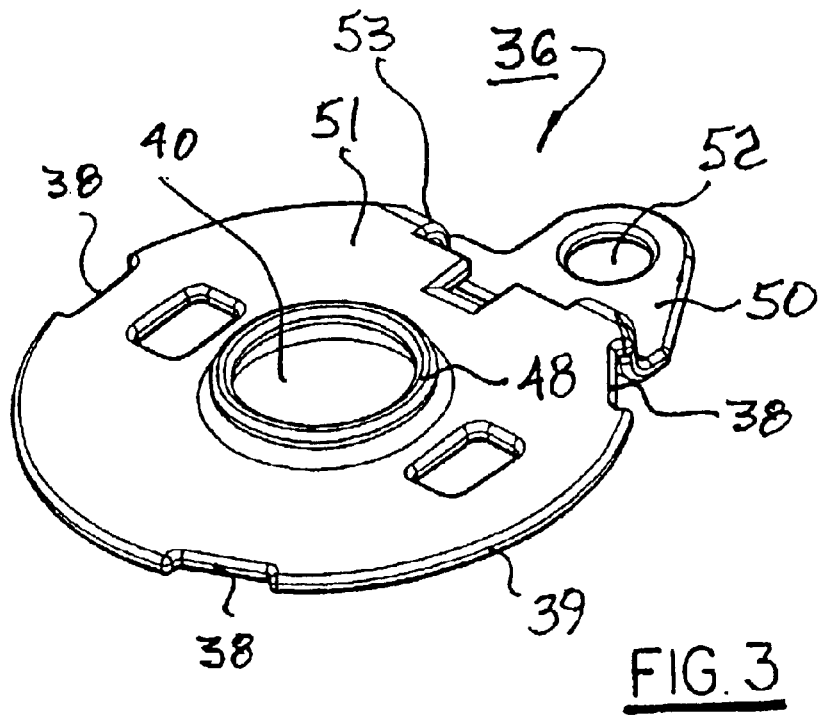
FIG. 3 is an isometric view of the retainer plate shown in FIGS. 1 and 2.

Referring to FIGS. 1 through 3, a partially-assembled transmission 10 in accordance with the invention includes a housing or gear-case 12 comprising a bottom wall 14 and sidewalls 16 defining a gear chamber 18. Housing 12 is receivable of a cover (not shown, for clarity) to enclose the gear chamber 18. An opening, preferably a motor well 20, is formed in bottom wall 14 and may extend either upwards or downwards, or both, from bottom wall 14. The open end of the motor well 20 within chamber 18 is provided with a plurality of lugs 22, preferably three arranged triagonally about the well, each lug having a slot 24 formed in its inner wall 26 and being transverse to the well axis 28, the walls and bottom surfaces of the slots defining a generally cylindrical space. Axially-operative spring means (not visible in FIG. 1) is provided in motor well 20 for resiliently supporting a non-driving end (not shown) of an electric motor 34 disposed axially in well 20. A generally disc-shaped motor retainer plate 36 has outside dimensions substantially the same as the dimensions of the cylindrical space defined by slots 24. The retainer plate has a pattern of edge notches 38 identical to the arrangement of the lugs but rotationally offset therefrom by a central angle greater than the central angle subtended by each notch. Plate 36 has a central aperture 40 for receiving a centering feature, for example, the motor frame 42 or the bearing 44 for output shaft 46. Aperture 40 may be defined by a lip edge 48 formed for engaging and snugly retaining a specific centering feature in a specific application as desired.

Figure 4:
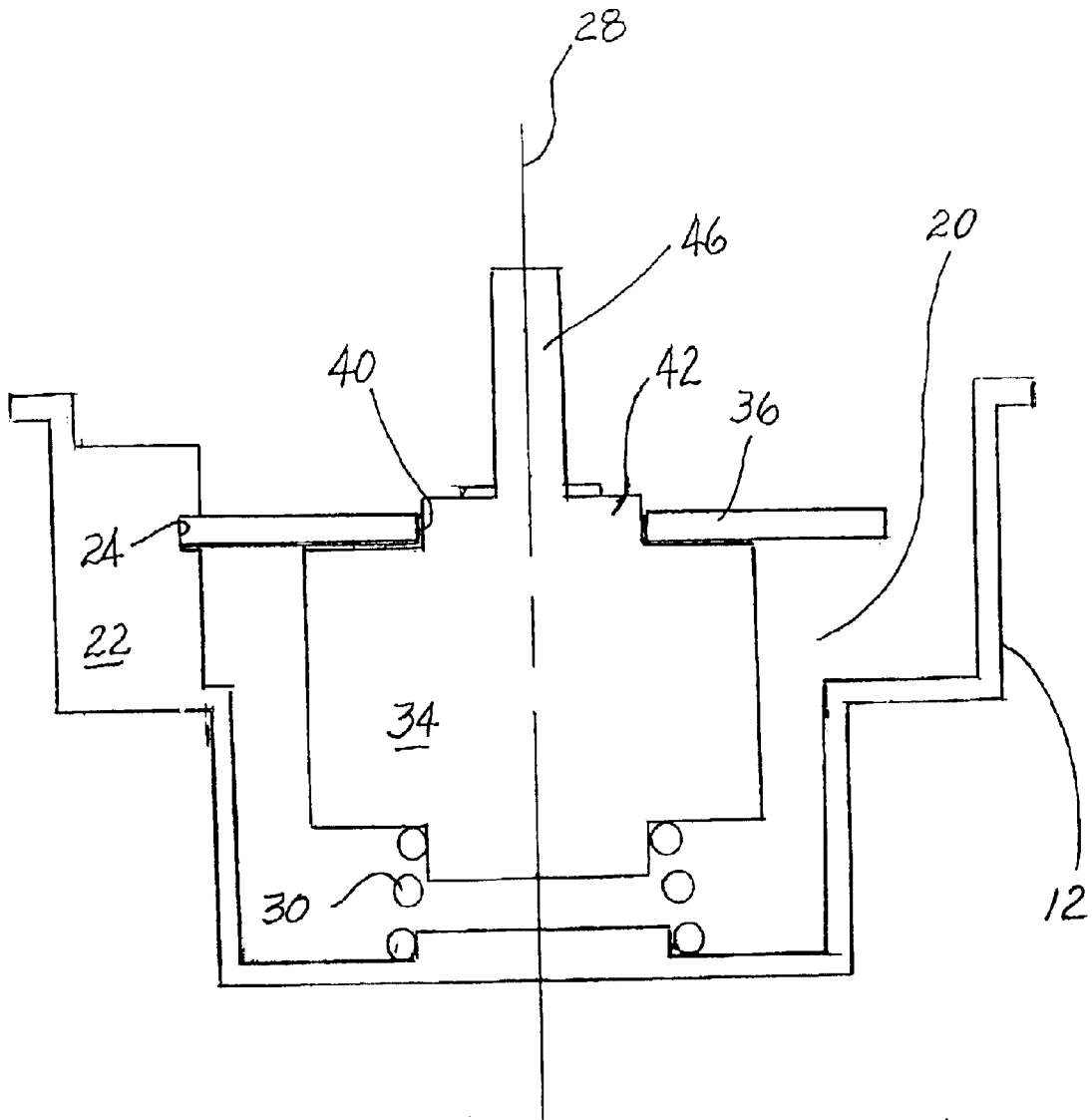
FIG. 4 is a sectioned side schematic view of the assembly cut through the center axis of the motor and through one of the lugs.

With motor 34 (preferably minus the drive gear, not shown) approximately centered in well 20 and resting on spring means 30 (FIG. 4), plate 36 is inserted axially onto the motor centering feature via central aperture 40 and past lugs 22 via notches 38, compressing the spring means. Plate 36 is then rotated through the recited central angle to engage the non-notched edge 39 of the plate into the slots, thereby securing and positioning the motor radially in the well, and therefore the housing, without need for any additional fasteners, gauges, or tools. The retainer plate is itself the fastener, position gauge, and mounting tool. Slots 24 are located axially of well 20 at a location selected to position motor 34 in the correct axial location in well 20, the motor and retainer plate 36 being urged against the upper sidewall of each slot by the spring means in the well. Preferably, plate 36 is provided further with one or more openings 58 through which insulated electrical motor terminals 60 project, permitting power connection to the motor within housing 12 and preventing motor frame 42 from rotating under plate 36 in response to counter-torque imposed by actuation of the drive train.

Alternatively, within the scope of the invention, the motor 34 may be attached to plate 36 in known fashion, as by bolts (not shown) extending through plate 36 and to bores (not shown) in motor frame 42. The assembled motor and plate are then inserted into well 20 and plate 36 is secured in place by lugs 22 and by spring means as described above.

A flange 50 extending radially from the disc portion 51 of motor retainer plate 36 has a second aperture 52 precisely located at a predetermined interaxial distance 54 from plate center aperture 40. The plane of flange 50 may be offset axially from the plane of disc portion 51 as needed for any particular housing configuration, and may require, as shown in FIG. 1, that a portion of the wall of well 20 be adapted to permit the needed rotation of the plate. With plate 36 rotated into motor-retaining position, second aperture 52 having a second axis 49 is coaxial with a shaft hole feature 56 formed in housing bottom 14 for receiving an idler shaft 57. Preferably, a stop 62 formed in bottom 14 engages flange 50 to limit rotation thereof (counterclockwise rotation as shown in FIG. 1) to correctly align aperture 52 with shaft hole feature 56. An idler shaft, when pressed into second aperture 52 and shaft hole feature 56 is thus accurately and reliably positioned with respect to the motor drive shaft. Further, the idler shaft, by extending through aperture 52 and into feature 56, locks retaining plate 36 against counter-rotating from engagement with lugs 22. Further, flange step 53 may be provided with a relief clearance 55 to accommodate an idler gear (not shown) mounted on the idler shaft.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A retainer plate for retaining an electric motor in a transmission housing having motor-mounting means including a plurality of lugs disposed in a circular pattern, said lugs defining slots, said retainer plate comprising a first aperture for receiving a drive shaft of said motor, a plate edge having a plurality of notches formed in accordance with said circular lug pattern for being passed axially of said lugs into proximity to said slots, said plate being rotatably engageable of said slots by said plate edge to secure said motor into said motor-mounting means.

2. A retainer plate in accordance with claim 1 further comprising a flange radially extending from said plate and having a second aperture for receiving an idler gear shaft.

3. A retainer plate in accordance with claim 2 wherein said first aperture defines a first axis of said plate and said second aperture defines a second and parallel axis of said plate, and wherein a distance between said first and second axes equals a desired interaxial distance between a motor drive gear and a driven gear in said transmission.

4. A retainer plate in accordance with claim 2 wherein said flange is axially offset from said plate.

5. A retainer plate in accordance with claim 1 wherein said plate further comprises means for engaging said motor to prevent rotation of a frame thereof with respect to said plate.

6. An electromechanical transmission, comprising:

a) a housing having motor-mounting means including a plurality of lugs disposed in a circular pattern, said lugs defining slots;

b) an electric motor disposed within said motor-mounting means and having a drive shaft extending coaxially within said circular pattern; and c) a motor retainer plate having a first aperture for receiving said motor shaft, a plate edge having a plurality of notches formed in accordance with said circular lug pattern for being passed axially of said lugs into proximity to said slots, said plate being rotatably engageable of said slots by said plate edge to secure said motor into said motor-mounting means.

7. A transmission in accordance with claim 6 further comprising a flange radially extending from said retainer plate and having a second aperture for receiving an idler gear shaft.

8. A transmission in accordance with claim 7 wherein said first aperture defines a first axis of said retainer plate and said second aperture defines a second and parallel axis of said retainer plate, and wherein a distance between said first and second axes equals a desired interaxial distance between a motor drive gear and a driven gear in said transmission.

9. A transmission in accordance with claim 7 wherein said motor-mounting means includes a well formed in said housing.

10. A transmission in accordance with claim 9 wherein said motor-mounting means includes a spring disposed in said well for engaging said motor to urge said motor against said retainer plate.

\* \* \* \* \*